United States Patent
Komatsumoto (10) Patent No.: US 8,002,634 B2
(45) Date of Patent: Aug. 23, 2011

(54) GAME MACHINE, GAME MACHINE CONTROL METHOD, AND INFORMATION STORAGE MEDIUM

(75) Inventor: Hidenori Komatsumoto, Chiba (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 730 days.

(21) Appl. No.: 12/067,853

(22) PCT Filed: Aug. 11, 2006

(86) PCT No.: PCT/JP2006/315951
§ 371 (c)(1),
(2), (4) Date: Mar. 24, 2008

(87) PCT Pub. No.: WO2007/034636
PCT Pub. Date: Mar. 29, 2007

(65) Prior Publication Data
US 2009/0111579 A1    Apr. 30, 2009

(30) Foreign Application Priority Data
Sep. 22, 2005  (JP) ................................. 2005-276923

(51) Int. Cl.
*A63F 9/24* (2006.01)
(52) U.S. Cl. ............................... 463/32; 463/33; 463/34
(58) Field of Classification Search .................... 463/32, 463/33, 34
See application file for complete search history.

(56) References Cited

U.S. PATENT DOCUMENTS
5,409,379 A    4/1995  Montag et al.
7,277,571 B2*  10/2007 Hara ............................ 382/154
2004/0021680 A1   2/2004 Hara
2008/0125202 A1*  5/2008 Kamiyama et al. ............... 463/1
2011/0018868 A1*  1/2011 Inoue et al. .................... 345/419

FOREIGN PATENT DOCUMENTS
| EP | 1136106 A2 | 9/2001 |
| EP | 1287865 A2 | 3/2003 |
| JP | 11-144063 A | 5/1999 |
| JP | 11-250232 A | 9/1999 |
| JP | 2001-276414 A | 10/2001 |
| JP | 2002-140724 A | 5/2002 |
| WO | 9703417 A1 | 1/1997 |

OTHER PUBLICATIONS

Niniane Wang, et al., "Rendering Falling Rain and Snow", XP002493711, ACM Siggraph 2004 Sketches.
Supplementary European Search Report dated Sep. 17, 2008.

* cited by examiner

*Primary Examiner* — Pierre E Elisca
(74) *Attorney, Agent, or Firm* — Sughrue Mion, PLLC (57) ABSTRACT

A game machine is provided in which processing load for displaying a scene of falling snow or falling rain, for example, on a game screen in a three-dimensional game can be reduced. An environmental effect object placement unit (snow object placement unit (64)) places a plurality of environmental effect objects in a target region of a three-dimensional game space based on a viewpoint position and a sight line direction. A target region controlling unit (snow generation target region controlling unit (60)) moves the target region, in response to a change of the viewpoint position or the sight line direction, based on the viewpoint position and sight line direction after the change. A display unit (70) displays a game screen representing a scene, in the three-dimensional game space in which the plurality of environmental effect objects are placed in the target region, viewed from the viewpoint position toward the sight line direction.

8 Claims, 9 Drawing Sheets

| POSITION COORDINATE OF REFERENCE POINT OF SNOW GENERATION TARGET REGION | $(x_0, y_0, z_0)$ |
|---|---|

FIG.6

| SNOW OBJECT ID | SNOW FALL TRAJECTORY PATTERN | POSITION COORDINATE |
|---|---|---|
| 1 | A | $(x_1, y_1, z_1)$ |
| 2 | D | $(x_2, y_2, z_2)$ |
| 3 | B | $(x_3, y_3, z_3)$ |

GAME MACHINE, GAME MACHINE CONTROL METHOD, AND INFORMATION STORAGE MEDIUM

TECHNICAL FIELD

The present invention relates to a game machine, a game machine control method, and an information storage medium.

BACKGROUND ART

A three-dimensional game which is a game which displays a game screen, in a three-dimensional game space, of a scene viewed from a given viewpoint position toward a given sight line direction is known. In such a three-dimensional game, display of a scene of, for example, falling snow or falling rain on a game screen often becomes necessary as effects of the game.
[Patent Document 1] Japanese Patent Laid-Open Publication No. 2002-140724

DISCLOSURE OF THE INVENTION

Problems to be Solved by the Invention

In a three-dimensional game of the related art, when a scene of falling snow is to be displayed on the game screen, for example, a plurality of snow objects are placed over the entire three-dimensional game space and a scene of the three-dimensional game space viewed from the given viewpoint position is displayed on the game screen. In this case, many snow objects must be placed in the three-dimensional game screen, resulting in an increased processing load.

The present invention was conceived in consideration of the above-described circumstances, and an object of the present invention is to provide a game machine, a game machine control method, and an information storage medium which enables reduction of load of the process for achieving an effect such as, for example, a scene of falling snow or falling rain in a three-dimensional game.

Means for Solving the Problems

In order to achieve the above-described object, according to one aspect of the present invention, there is provided a game machine which displays a game screen representing a scene, in a three-dimensional game space, viewed from a given viewpoint position toward a given sight line direction, the game machine comprising environmental effect object placement means for placing a plurality of environmental effect objects in a target region of the three-dimensional game space based on the viewpoint position and the sight line direction; target region controlling means for moving the target region, in response to a change of the viewpoint position or the sight line direction, based on the viewpoint position and the sight line direction after the change; and display means for displaying a game screen representing a scene, in the three-dimensional game space in which the plurality of environmental effect objects are placed in the target region, viewed from the viewpoint position toward the sight line direction.

According to another aspect of the present invention, there is provided a method of controlling a game machine which displays a game screen representing a scene, in a three-dimensional game space, viewed from a given viewpoint position toward a given sight line direction, the method comprising an environmental effect object placement step in which a plurality of environmental effect objects are placed in a target region of the three-dimensional game space based on the viewpoint position and the sight line direction; a target region controlling step in which the target region is moved, in response to a change of the viewpoint position or the sight line direction, based on the viewpoint position and the sight line direction after the change; and a display controlling step in which display means displays a game screen representing a scene, in the three-dimensional game space in which the plurality of the environmental effect objects are placed in the target region, viewed from the viewpoint position toward the sight line direction.

According to another aspect of the present invention, there is provided a program which causes a computer such as a home game machine, a commercial game machine, a portable game machine, a portable phone, a personal computer, and a server computer to function as a game machine which displays a game screen representing a scene, in a three-dimensional game space, viewed from a given viewpoint position toward a given sight line direction, the program causing the computer to function as environmental effect object placement means for placing a plurality of environmental effect objects in a target region of the three-dimensional game space based on the viewpoint position and the sight line direction; target region controlling means for, in response to a change of the viewpoint position or the sight line direction, moving the target region based on the viewpoint position and the sight line direction after the change; and display means for displaying a game screen representing a scene, in the three-dimensional game space in which the plurality of environmental effect objects are placed in the target region, viewed from the viewpoint position toward the sight line direction.

According to another aspect of the present invention, there is provided an information storage medium which is a computer readable information storage medium storing the program. According to another aspect of the present invention, there is provided a program distribution device comprising an information storage medium storing the program and which reads the program from the information storage medium and distributes the program. According to another aspect of the present invention, there is provided a program distribution method, while using an information storage medium storing the program, for reading the program from the information storage medium and distributing the program.

The present invention relates to a game machine which displays a game screen representing a scene viewed from a given viewpoint position toward a given sight line direction in a three-dimensional game space. In the present invention, a plurality of environmental effect objects are placed in a target region of the three-dimensional game space based on the viewpoint position and the sight line direction. In addition, in the present invention, the target region is moved in response to a change of the viewpoint position or the sight line direction based on the viewpoint position and the sight line direction after the change. Moreover, in the present invention, a game screen representing a scene, in a three-dimensional game space in which the plurality of the environmental effect objects are placed in the target region, viewed from the viewpoint position toward the sight line direction is displayed. Here, an environmental effect object is an object for achieving an effect of an environment in the three-dimensional game space, and may be, for example, an object representing snow or rain. According to the present invention, a process load for displaying a scene of, for example, falling snow or falling rain on a game screen in a three-dimensional game can be reduced.

According to another aspect of the present invention, the environmental effect object placement means may move, when the viewpoint position or the sight line direction changes, the plurality of environmental effect objects in the target region in a direction opposite to the direction of the change of the viewpoint position or the sight line direction.

According to another aspect of the present invention, the target region controlling means may comprise reference point position storage means for storing a position of a reference point in the target region and may update, in response to the change of the viewpoint position or the sight line direction, the position of the reference point stored in the reference point position storage means based on the viewpoint position and the sight line direction after the change, the environmental effect object placement means may comprise environmental effect object position storage means for storing a relative position from the reference point as a position of each of the plurality of environmental effect objects, and the display means may display the game screen representing the scene, in the three-dimensional game space in which the plurality of environmental effect objects are placed in the target region, viewed from the viewpoint position toward the sight line direction based on a stored content of the reference point position storage means and a stored content of the environmental effect object position storage means.

According to another aspect of the present invention, the environmental effect object placement means may change a transparency of the environmental effect object when the viewpoint position or the sight line direction changes.

BEST MODE FOR CARRYING OUT THE INVENTION

One example of an embodiment of the present invention will now be described in detail with reference to the drawings.

Figure 1:
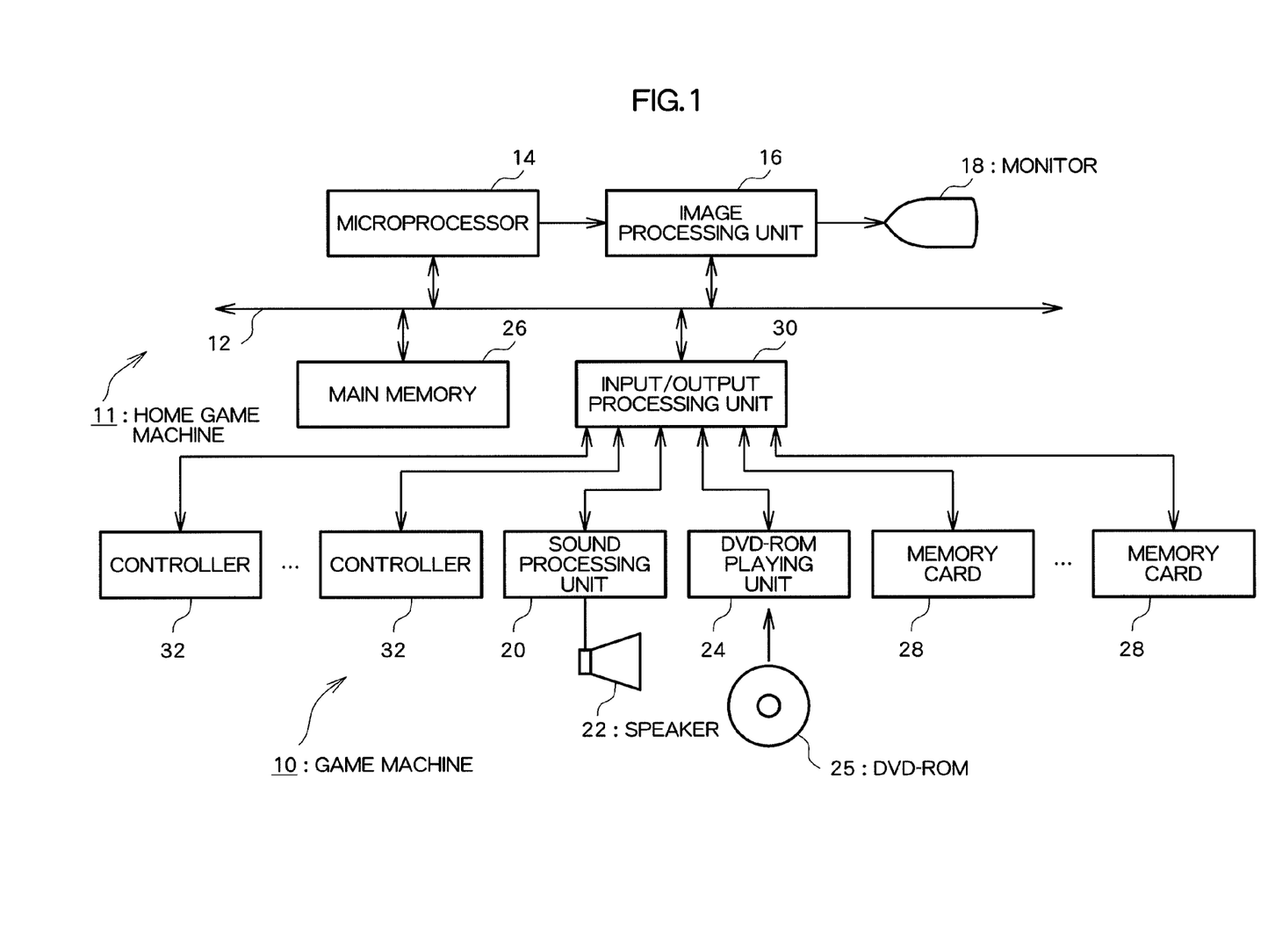
FIG. 1 is a diagram showing a hardware structure of a game machine according to an embodiment of the present invention.

FIG. 1 is a diagram showing a hardware structure of a game machine according to the embodiment of the present invention. A game machine 10 shown in FIG. 1 is constructed by including a home game machine 11 with a DVD-ROM 25 and a memory card 28 which are information storage media and connecting a monitor 18 and a speaker 22. For example, a home television receiver is used as the monitor 18 and a built-in speaker of the television receiver is used as the speaker 22.

The home game machine 11 is a known computer game system comprising a bus 12, a microprocessor 14, an image processing unit 16, a sound processing unit 20, a DVD-ROM playing unit 24, a main memory 26, an input/output processing unit 30, and a controller 32. The constituent elements other than the controller 32 are stored in a housing.

The bus 12 is provided for exchanging address and data between various sections of the home game machine 11. The microprocessor 14, image processing unit 16, main memory 26, and input/output processing unit 30 are connected by the bus 12 in a manner to enable mutual data communication.

The microprocessor 14 controls various sections of the home game machine 11 according to an operating system stored in a ROM (not shown), a program which is read from the DVD-ROM 25, and data which is read from the memory card 28. The main memory 26 comprises, for example, a RAM, and a program which is read from the DVD-ROM 25 and data which is read from the memory card 28 are written as necessary. The main memory 26 is also used as a working memory of the microprocessor 14.

The image processing unit 16 comprises a VRAM, and renders a game screen in the VRAM based on image data sent from the microprocessor 14. The contents of the rendered game screen are converted to a video signal and output to the monitor 18 at a predetermined timing. More specifically, the image processing unit 16 receives, from the microprocessor 14, a vertex coordinate (X, Y, Z), vertex color information (R, G, B), a texture coordinate (VX, VY), and alpha value or the like for each polygon in a viewpoint coordinate system. The image processing unit 16 renders in the VRAM the color information, Z value (depth information), alpha value, etc. of each pixel of a display image using these pieces of information. The display image is output to the monitor 18 at a predetermined timing.

The input/output processing unit 30 is an interface for the microprocessor 14 to access the sound processing unit 20, DVD-ROM playing unit 24, memory card 28, and controller 32. The sound processing unit 20, DVD-ROM playing unit 24, memory card 28, and controller 32 are connected to the input/output processing unit 30.

The sound processing unit 20 comprises a sound buffer. The sound processing unit 20 plays various sound data such as game music, sound effects of the game, messages, etc. which are read from the DVD-ROM 25 and stored in the sound buffer, and outputs from the speaker 22.

The DVD-ROM playing unit 24 reads a program stored on the DVD-ROM 25 according to an instruction from the microprocessor 14. Here, a configuration is described in which the DVD-ROM 25 is used for supplying the program to the home game machine 11, but alternatively, various other information storage media may be used such as a CD-ROM, a ROM card, etc. Alternatively, the program may be supplied from a remote location via a data communication network such as the Internet to the home game machine 11.

The memory card 28 comprises a nonvolatile memory (such as, for example, EEPROM). The home game machine 11 has a plurality of memory card slots on which the memory card 28 can be equipped, so that a plurality of memory cards 28 can be simultaneously equipped. The memory card 28 is formed to be detachable from the memory card slot, and is used, for example, for storing various game data such as save data.

The controller 32 is a general-purpose operation inputting device for the player to input various game operations. The input/output processing unit 30 periodically scans the state of various sections of the controller 32 at a predetermined period (for example, every 1/60 second), and sends an operation signal indicating the scan result via the bus 12 to the microprocessor 14. The microprocessor 14 determines the game operation of the player based on the operation signal. The home game machine 11 is configured so that a plurality of controllers 32 can be connected, and the microprocessor 14 controls the game based on operation signals which are input from the controllers 32.

Figure 2:
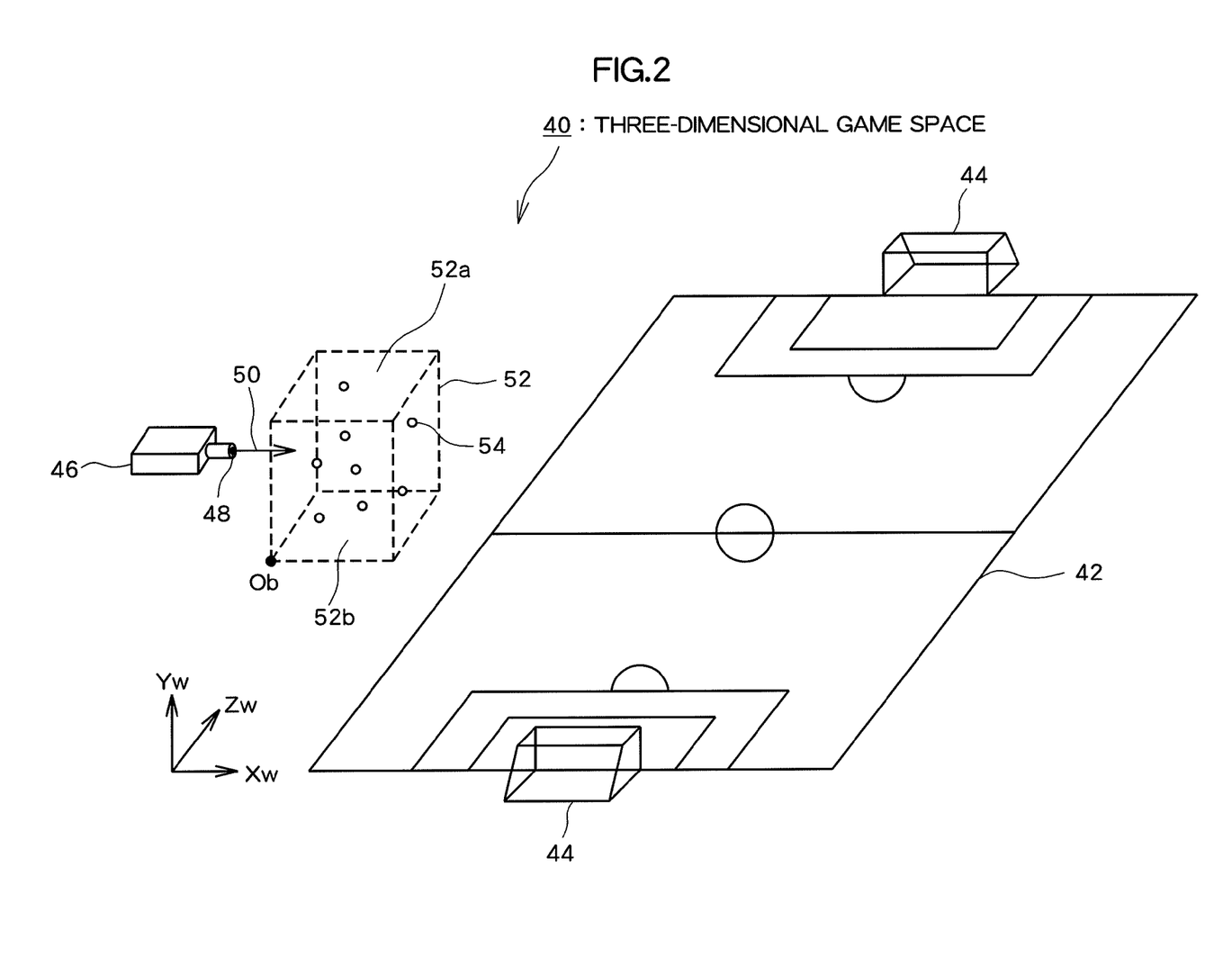
FIG. 2 is a perspective view showing an example of a three-dimensional game space.

In the game machine 10 having the hardware structure as described above, a three-dimensional game space (virtual three-dimensional space) is constructed in the main memory 26. FIG. 2 is a perspective view schematically showing a part of the three-dimensional game space. As shown in FIG. 2, a field object 42 is placed parallel to an Xw-Zw plane in a three-dimensional game space 40. In addition, a goal object 44 is placed in the three-dimensional game space 40. On the field object 42, objects such as, for example, a player object which represents a soccer player and a ball object which represents a soccer ball are also placed, but these objects are not shown in FIG. 2.

A virtual camera 46 is placed in the three-dimensional game space 40. The virtual camera 46 is a virtual imaging unit, and a scene of the three-dimensional game space 40 imaged by the virtual camera 46 is displayed on the monitor 18. In other words, a scene in the three-dimensional game space 40 viewed from a viewpoint position 48 toward a sight line direction 50 is displayed on the monitor 18. The position (viewpoint position 48) and direction (sight line direction 50) of the virtual camera 46 change as game status changes. For example, the position and direction of the virtual camera 46 may change according to a change of a position of the player object operated by a game player and a change of a position of the ball object. Here, a configuration is described in which the virtual camera 46 is translated in a Zw axial direction according to a change of the game status.

Figure 3:
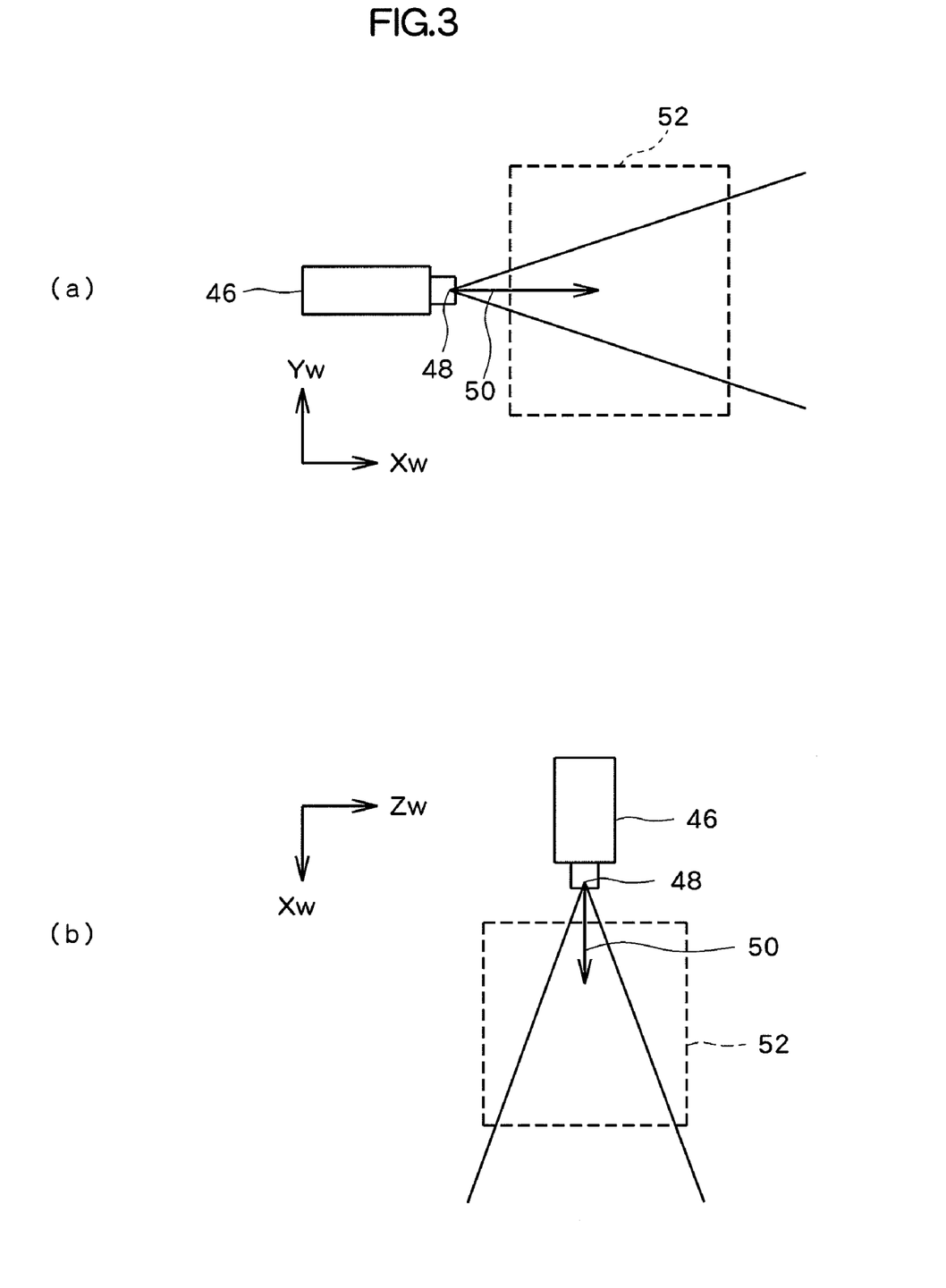
FIG. 3 is a diagram for explaining a positional relationship between a virtual camera and a snow generation target region.

A snow generation target region 52 is virtually set in front of a front side of the virtual camera 46. The snow generation target region 52 is set based on the position and direction of the virtual camera 46, and, as shown in FIGS. 3(a) and 3(b), the snow generation target region 52 is set such that a scene in the three-dimensional game space 40 viewed from the virtual camera 46 through the snow generation target region 52 is displayed on the game screen. In the present embodiment, the snow generation target region 52 is a region having the shape of a rectangular parallelepiped. In addition, in the present embodiment, the snow generation target region 52 is set such that the sight line direction 50 is orthogonal to a specific plane region of the snow generation target region 52 and intersects a center of the snow generation target region 52.

A positional relationship between the virtual camera 46 and the snow generation target region 52 is set to be always constant. In other words, the snow generation target region 52 follows the changes of the position and direction of the virtual camera 46. For example, when the virtual camera 46 is translated in the Zw axial direction, the snow generation target region 52 is also translated in the Zw axial direction by a same amount.

A plurality of snow objects 54 are placed in the snow generation target region 52. The snow object 54 is first placed at a randomly determined position on an upper surface region 52a of the snow generation target region 52. Then, the snow objects 54 move toward a bottom surface region 52b according to a snow fall trajectory pattern which is randomly selected for each snow object 54 from among a plurality of types of snow fall trajectory patterns. Upon reaching the bottom surface region 52b, the snow object 54 disappears. An upper limit number of the snow objects 54 which can be included in the snow generation target region 52 is determined in advance, and the number of snow objects 54 in the snow generation target region 52 does not exceed the upper limit number.

In the game machine 10 of the present embodiment, a scene of the three-dimensional game space 40 viewed from the virtual camera 46 through the snow generation target region 52 is always displayed on the monitor 18. Because of this, in the game machine 10, by placing the plurality of snow objects 54 in the snow generation target region 52, it is possible to realize an effect of snow apparently falling over the entire three-dimensional game space 40 without placing the plurality of snow objects 54 over the entire three-dimensional game space 40. In other words, in the game machine 10 of the present embodiment, the effect simulating the snow falling over the entire three-dimensional game space 40 is realized while the number of snow objects 54 is reduced.

Figure 4:
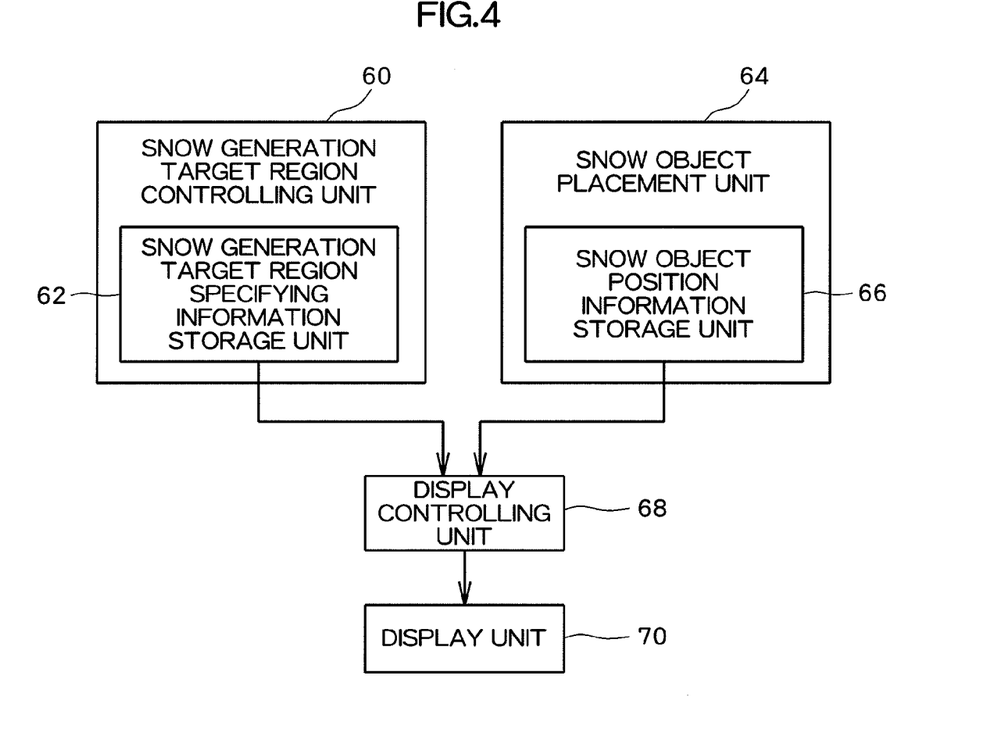
FIG. 4 is a functional block diagram of a game machine according to the embodiment of the present invention.

A functional structure of the game machine 10 will now be described. FIG. 4 is a functional block diagram primarily showing functions, among the functions realized in the game machine 10, related to the present invention. As shown in FIG. 4, the game machine 10 comprises, in terms of functions, a snow generation target region controlling unit 60, a snow object placement unit 64, a display controlling unit 68, and a display unit 70. These functions are realized by the program which is read from the DVD-ROM 25 being executed by the microprocessor 14.

[1. Snow Generation Target Region Controlling Unit]

The snow generation target region controlling unit 60 is realized mainly with the microprocessor 14 and the main memory 26. In response to a change of the position or the direction of the virtual camera 46, the snow generation target region controlling unit 60 moves the snow generation target region 52 based on the position or direction of the virtual camera 46 after the change.

Figure 5:
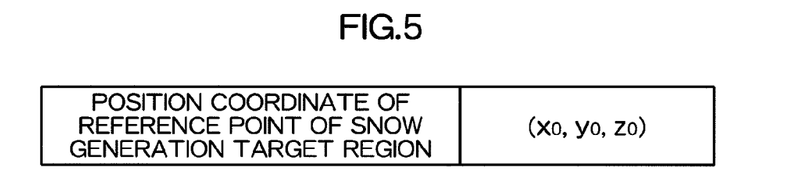
FIG. 5 is a diagram showing an example of snow generation target region specifying data.

The snow generation target region controlling unit 60 comprises a snow generation target region specifying information storage unit 62 (reference point position storage means). The snow generation target region specifying information storage unit 62 stores information for specifying the snow generation target region 52. In the present embodiment, snow generation target region specifying data shown in FIG. 5, for example, is stored in the snow generation target region specifying information storage unit 62. As shown in FIG. 5, the snow generation target region specifying data is data indicating a position coordinate (position coordinate in an XwYwZw coordinate system) of a reference point of the snow generation target region 52 in the three-dimensional game space 40. Here, the reference point Ob of the snow generation target region 52 is set as shown in FIG. 2. In the present embodiment, the snow generation target region specifying data is updated in response to a movement of the virtual camera 46 (refer to S102 of FIG. 8).

[2. Snow Object Placement Unit]

The snow object placement unit 64 (environmental effect object placement means) is realized mainly with the microprocessor 14 and the main memory 26. The snow object placement unit 64 places a plurality of snow objects 54 (environmental effect objects) in the snow generation target region 52.

Figure 6:
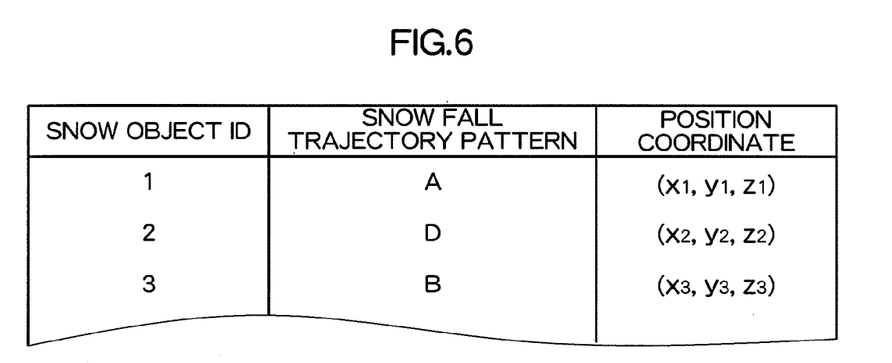
FIG. 6 is a diagram showing an example of a snow object table.

The snow object placement unit 64 comprises a snow object position information storage unit 66. The snow object position information storage unit 66 stores information for specifying a position of the snow object 54. In the present embodiment, a snow object table as shown in FIG. 6 is stored in the snow object position information storage unit 66. As shown in FIG. 6, the snow object table includes a "snow object ID" field, a "snow fall trajectory pattern" field, and a "position coordinate" field. The "snow object ID" field stores identification information for uniquely identifying the snow object 54. The "snow fall trajectory pattern" field stores information indicating one of the plurality of types of snow fall trajectory patterns.

Figure 7:
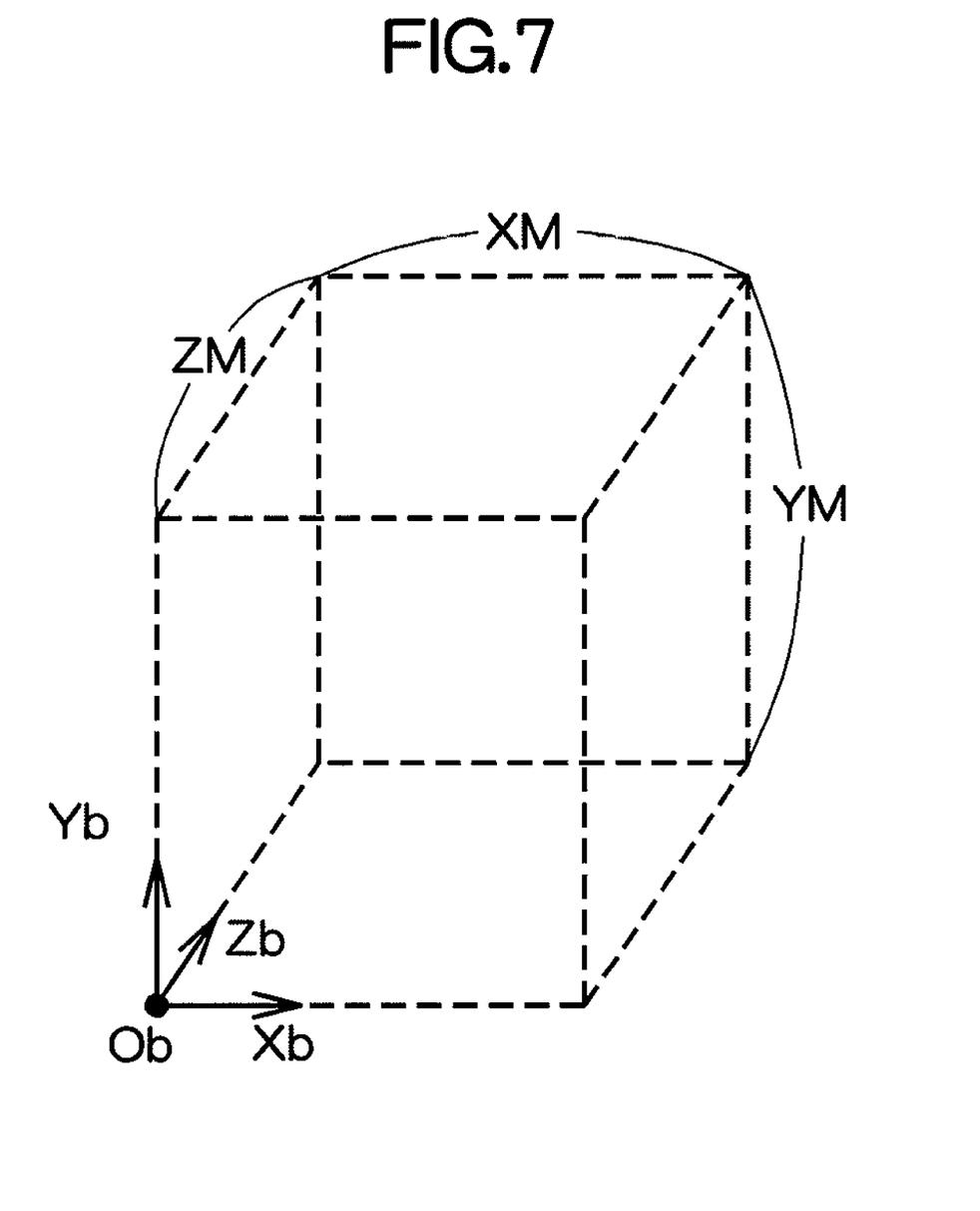
FIG. 7 is a diagram for explaining a coordinate system having an origin at a reference point of the snow generation target region.

The "position coordinate" field stores a position coordinate of the snow object 54. The "position coordinate" field stores, as the position coordinate of the snow object 54, a relative position coordinate from a reference point Ob of the snow generation target region 52. In other words, a position coordinate, for example, as shown in FIG. 7, in a coordinate system having the origin at the reference point Ob of the snow generation target region 52 (XbYbZb coordinate system) is stored in the "position coordinate" field.

Figure 8:
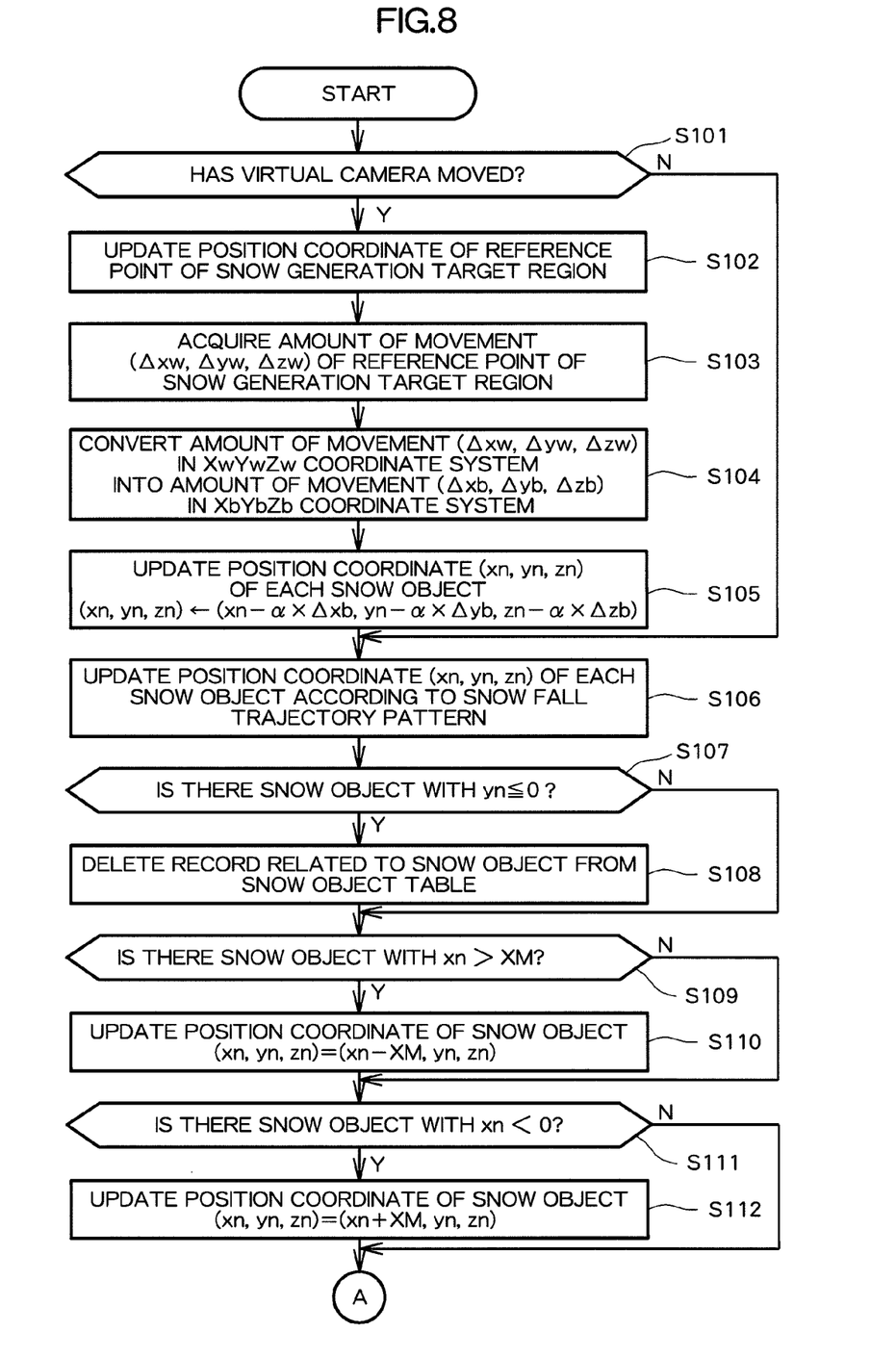
FIG. 8 is a flowchart showing a process executed in the game machine.

The snow object placement unit 64 updates the position of each snow object 54 stored in the snow object position information storage unit 66 according to the snow fall trajectory pattern corresponding to the snow object 54 every predetermined interval (1/60 seconds in the present embodiment) (refer to S106 in FIG. 8). In addition, the snow object placement unit 64 updates the position of each snow object 54 stored in the snow object position information storage unit 66 in response to a movement of the virtual camera 46 (movement of the snow generation target region 52) (refer to S105 in FIG. 8).

[3. Display Controlling Unit and Display Unit]

The display controlling unit 68 is realized mainly with the microprocessor 14 and the image processing unit 16. The display unit 70 is realized mainly with the monitor 18. The display controlling unit 68 causes a game screen representing a scene, viewed from the virtual camera 46, of the "three-dimensional game space 40 in which a plurality of the snow objects 54 are placed in the snow generation target region 52" to be displayed on the display unit 70.

Figure 9:
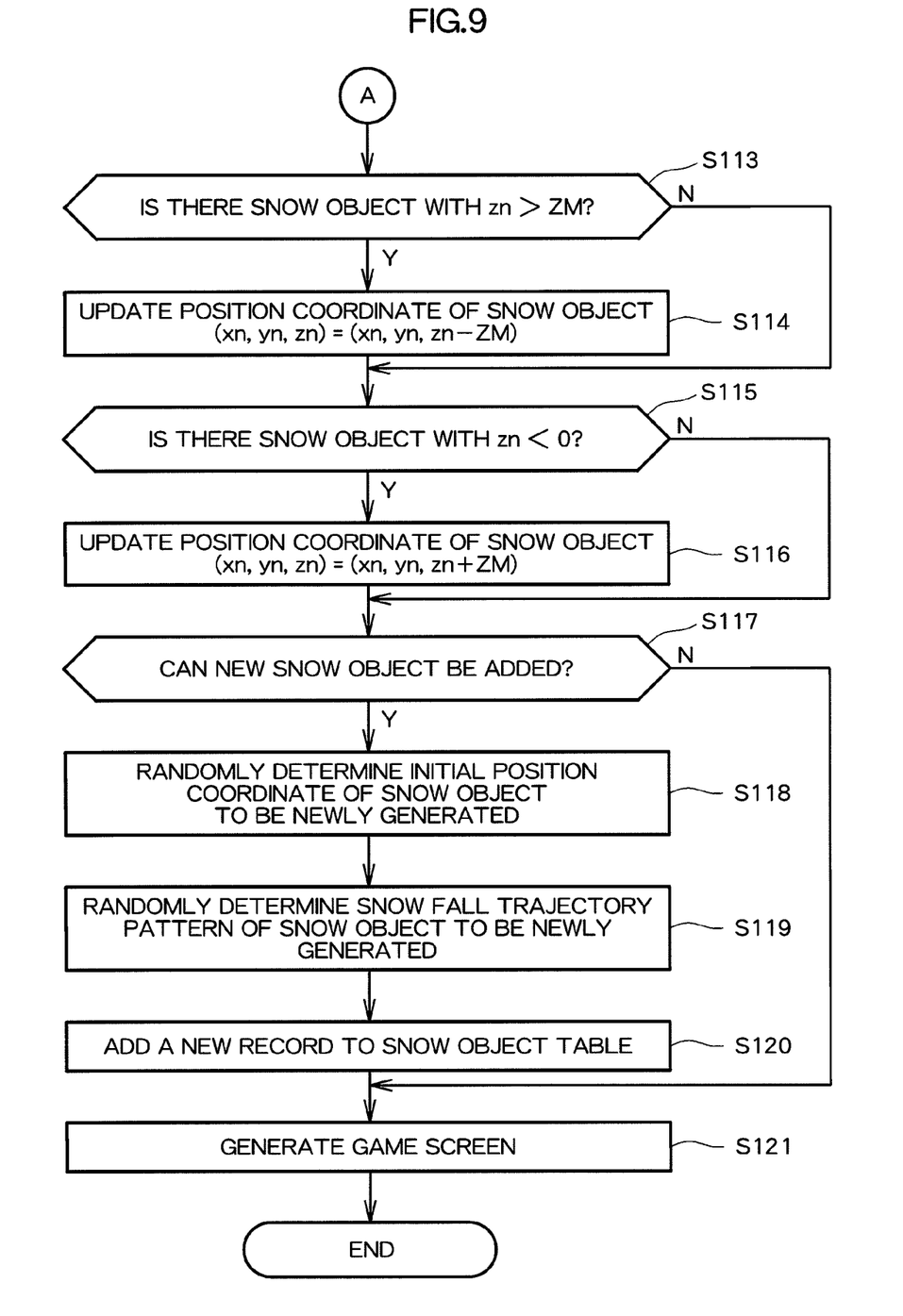
FIG. 9 is a flowchart showing a process executed in the game machine.

Next, a process periodically executed by the game machine 10 at a predetermined interval (1/60 second in the present embodiment) will be described. FIGS. 8 and 9 show flowcharts of processes, among the processes periodically executed by the game machine 10 at a predetermined interval, related to the present invention. The process of FIGS. 8 and 9 is realized by a program which is stored in the DVD-ROM 25 being executed by the microprocessor 14.

As shown in FIG. 8, in this process, first, the snow generation target region controlling unit 60 determines whether or not the virtual camera 46 (viewpoint position 48) has moved (S101). In the present embodiment, the position coordinate of the virtual camera 46 in the three-dimensional game space 40 is stored in the main memory 26. The snow generation target region controlling unit 60 determines whether or not there is a change in the position coordinate of the virtual camera 46 stored in the main memory 26.

When the snow generation target region controlling unit 60 determines that the virtual camera 46 has moved, the snow generation target region controlling unit 60 calculates the reference point Ob of the snow generation target region 52 based on the position and direction of the virtual camera 46 after the movement, and updates the position coordinate of the reference point Ob of the snow generation target region 52 stored in the snow generation target region specifying data (S102).

Next, the snow generation target region controlling unit 60 acquires an amount of movement ($\Delta xw$, $\Delta yw$, $\Delta zw$) of the reference point Ob of the snow generation target region 52 for each axial direction (Xw axial direction, Yw axial direction, Zw axial direction) (S103). Here, when the virtual camera 46 has moved in a Xw axis positive direction, the value of $\Delta xw$ is positive, and, when the virtual camera 46 has moved in a Xw axis negative direction, the value of $\Delta xw$ is negative. The values of $\Delta yw$ and $\Delta zw$ follow a similar pattern. Because the positional relationship between the virtual camera 46 and the reference point Ob of the snow generation target region 52 is constant, the amount of movement of the reference point Ob of the snow generation target region 52 in each axial direction is equal to the amount of movement of the virtual camera in each axial direction.

Next, the snow generation target region controlling unit 60 converts the amount of movement in the XwYwZw coordinate system ($\Delta xw$, $\Delta yw$, $\Delta zw$) into an amount of movement ($\Delta xb$, $\Delta yb$, $\Delta zb$) in a XbYbZb coordinate system (S104). The snow object placement unit 64 updates the position coordinate ($x_n$, $y_n$, $z_n$) of each snow object 54 stored in the snow object table with ($x_n - \alpha^* \Delta xb$, $y_n - \alpha^* \Delta yb$, $z_n - \alpha^* \Delta zb$) (S105). Here, the coefficient $\alpha$ is a numerical value in a range of $0 < \alpha < 1$.

Figure 10:
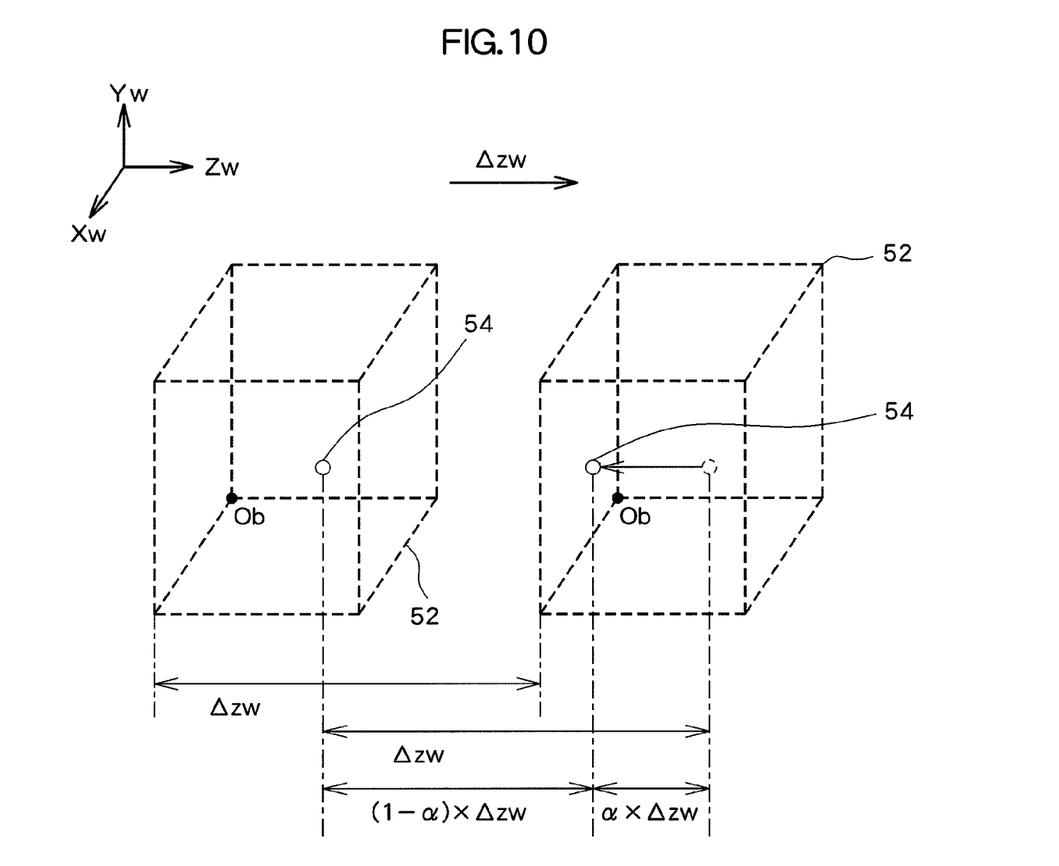
FIG. 10 is a diagram for explaining limitation of an amount of movement for a snow object.

As described, in the present embodiment, when the snow generation target region 52 moves (when the virtual camera 46 moves), the position (that is, relative position from the reference point Ob of the snow generation target region 52) of each snow object 54 in the snow generation target region 52 is updated to a position moved from the current position in a direction opposite to the movement direction of the snow generation target region 52 and by an amount of movement obtained by multiplying the amount of movement of the snow generation target region 52 by a predetermined coefficient $\alpha$. Because of this, as shown in FIG. 10, for example, when the snow generation target region 52 moves in a Zw axis positive direction by $\Delta zw$, the position of the snow object 54 in the snow generation target region 52 is updated to "a position moved from the current position in a Zw axis negative direction by $\alpha^* \Delta zw$". In this case, in the three-dimensional game space 40, while the snow generation target region 52 has moved in a Zw axis positive direction by $\Delta zw$, the snow object 54 has moved in the Zw axis positive direction by $(1-\alpha)^* \Delta zw$. In other words, the amount of movement of the snow object 54 in the three-dimensional game space 40 is inhibited compared to the amount of movement of the virtual camera 46 (amount of movement of the snow generation target region 52).

When the virtual camera 46 moves by a large amount, if the snow object 54 is moved by a large amount corresponding to the virtual camera 46, the scene of the snow object 54 moving in the three-dimensional game space 40 by a large amount is displayed on the game screen, resulting in a unpleasant impression for the player. In consideration of this, in the present embodiment, the amount of movement of the snow object 54 in the three-dimensional game space 40 is inhibited compared to the amount of movement of the virtual camera 46, in order to curb occurrence of such a situation.

The value of the coefficient $\alpha$ may be determined based on the amount of movement of the virtual camera 46 (amount of movement of the snow generation target region 52). For example, the value of the coefficient $\alpha$ may be set to 0 when the amount of movement of the virtual camera is less than a predetermined reference amount of movement and to a predetermined value (for example, 0.4) when the amount of movement of the virtual camera 46 is greater than or equal to the predetermined reference amount of movement. In this manner, the amount of movement of the snow object 54 may be inhibited only when the amount of movement of the virtual camera 46 is greater than or equal to a predetermined reference amount of movement.

Alternatively, the value of the coefficient α a may set to differ for each snow object 54. For example, the value of the coefficient α may be determined for each snow object 54 based on a distance between the snow object 54 and the virtual camera 46. For example, the value of the coefficient α for a snow object 54 may be set to 0 when the distance between the snow object 54 and the virtual camera 46 is greater than or equal to a predetermined reference distance, and to a predetermined value (for example, 0.4) when the distance between the snow object 54 and the virtual camera 46 is less than the predetermined reference distance. In this manner, the amount of movement of the snow object 54 may be inhibited only when the distance from the virtual camera 46 is relatively small and the snow object 54 tends to stand out in the game screen.

When it is determined in S101 that the virtual camera 46 has moved and the processes of S102-S105 are executed, or when it is determined in S101 that the virtual camera 46 has not moved, the snow object placement unit 64 updates the position coordinate (xn, yn, zn) of each snow object 54 stored in the snow object table according to the snow fall trajectory pattern corresponding to the snow object 54 (S106).

Then, the snow object placement unit 64 determines whether or not there is a snow object 54 reaching the bottom surface region 52b of the snow generation target region 52. In other words, the snow object placement unit 64 determines whether or not there is a snow object 54 with yn≦0 (S107). When there is a snow object 54 having yn≦0, the snow object placement unit 64 deletes a record corresponding to the snow object 54 from the snow object table (S108).

Next, the snow object placement unit 64 executes a process to always place the snow objects 54 in the snow generation target region 52 (S109-S116).

More specifically, the snow object placement unit 64 determines whether or not there is a snow object 54 with xn>XM (S109). Here, XM represents a size of the snow generation target region 52 in the Xb axial direction (refer to FIG. 7). When there is a snow object 54 with xn>XM, the snow object placement unit 64 updates the position coordinate (xn, yn, zn) of the snow object 54 to (xn−XM, yn, zn) (S110).

In addition, the snow object placement unit 64 determines whether or not there is a snow object 54 with xn<0 (S111). When there is a snow object 54 with xn<0, the snow object placement unit 64 updates the position coordinate (xn, yn, zn) of the snow object 54 to (xn+XM, yn, zn) (S112).

The snow object placement unit 64 then determines whether or not there is a snow object with zn>ZM (S113). Here, ZM represents a size of the snow generation target region 52 in the Zb axial direction (refer to FIG. 7). When there is a snow object 54 with zn>ZM, the snow object placement unit 64 updates the position coordinate (xn, yn, zn) of the snow object 54 to (xn, yn, zn−ZM) (S114).

In addition, the snow object placement unit 64 determines whether or not there is a snow object 54 with zn<0 (S115). When there is a snow object 54 with zn<0, the snow object placement unit 64 updates the position coordinate (xn, yn, zn) of the snow object 54 to (xn, yn, zn+ZM) (S116).

Figure 11:
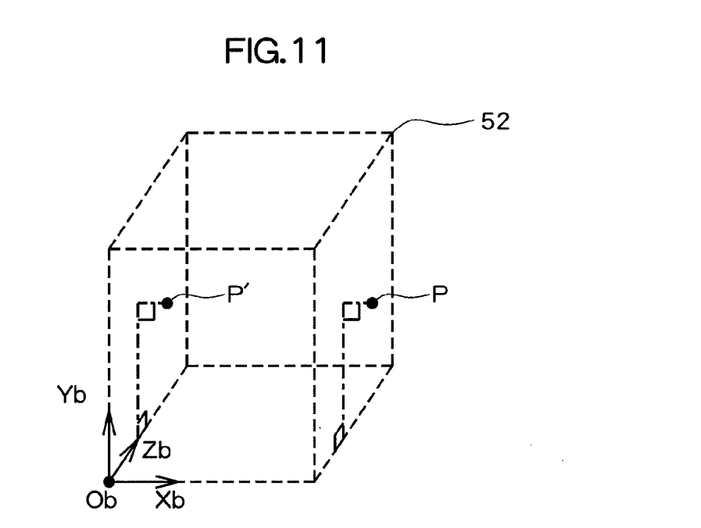
FIG. 11 is a diagram for explaining about preventing the snow object from getting out of the snow generation target region.

In the present embodiment, because the initial position and snow fall trajectory pattern of the snow object 54 are determined based on random numbers, there may be cases, depending on the combination of the initial position and the snow fall trajectory pattern, in which the snow object 54 moves out of the snow generation target region 52 before reaching the bottom surface region 52b. In the present embodiment, because the snow generation target region 52 is placed so that a scene of the three-dimensional game space 40 viewed from the virtual camera 46 through the snow generation target region 52 is displayed on the game screen (refer to FIGS. 3(a) and 3(b)), the snow object 54 moving out of the snow generation target region 52 is not likely be displayed in the game screen, and thus presence of such a snow object 54 is not desirable in view of reduction of the processing load for effects of falling snow. In this regard, in the present embodiment, the above-described processes (S109-S116) are executed so that when the position of the snow object 54 is at a position P outside of the snow generation target region 52, as shown in FIG. 11, for example, the position of the snow object 54 is updated to the position P' in the snow generation target region 52, and consequently the snow objects 54 are always positioned in the snow generation target region 52.

Next, the snow object placement unit 64 determines whether or not a new snow object 54 can be generated (S117). For example, the snow object placement unit 64 determines whether or not the number of the snow objects 54 included in the snow generation target region 52 is less than a predetermined upper limit number. When the number of snow objects 54 in the snow generation target region 52 is less than the predetermined upper limit number, the snow object placement unit 64 determines that a new snow object 54 can be generated.

When the snow object placement unit 64 determines that a new snow object 54 can be generated, the snow object placement unit 64 randomly determines, as an initial position coordinate of the snow object 54 to be newly generated, a position coordinate on the upper surface region 52a of the snow generation target region 52 (S118). More specifically, the snow object placement unit 64 determines an Xb axis coordinate (xn) based on a random number within a range of greater than or equal to 0 and less than or equal to XM and a Zb axis coordinate (zn) based on a random number within a range of greater than or equal to 0 and less than or equal to ZM. An Yb axis coordinate (yn) is set to YM. Here, YM represents a size of the snow generation target region 52 in the Yb axial direction (refer to FIG. 7).

In addition, the snow object placement unit 64 randomly determines a snow fall trajectory pattern of the snow object 54 to be newly generated (S119). In the present embodiment, a plurality of types of snow fall trajectory patterns are prepared, and one of the snow fall trajectory patterns is selected based on a random number.

The snow object placement unit 64 adds a new record in the snow object table (S120). In this case, a snow object ID which is created to not overlap is stored in the "snow object ID" field of the record to be added. Information indicating the snow fall trajectory pattern determined in S119 is stored in the "snow fall trajectory pattern" field. The initial position coordinate determined in S118 is stored in the "position coordinate" field.

After the processes of S101-S120 are executed, the display controlling unit 68 generates, on a VRAM, a game screen representing a scene viewed from the virtual camera 46 of the "three-dimensional game space 40 in which a plurality of snow objects 54 are placed" (S121). In this case, the position coordinate of each snow object 54 in the XwYwZw coordinate system is acquired based on a position coordinate of the reference point Ob of the snow generation target region 52 stored in the snow generation target region specifying data and the position coordinate of each snow object 54 in the XbYbZb coordinate system stored in the snow object table. The game screen formed on the VRAM is displayed on the display unit 70 at a predetermined timing.

As described, with the game machine 10 according to the present embodiment, a scene of the three-dimensional game space 40 viewed from the virtual camera 46 through the snow generation target region 52 is displayed on the monitor 18. Because of this, in the game machine 10, by placing the plurality of snow objects 54 in the snow generation target region 52, it is possible to realize an effect of snow apparently falling over the entire three-dimensional game screen 40 without placing the plurality of snow objects 54 over the entire three-dimensional game screen 40. In other words, in the game machine 10 of the present embodiment, an effect of snow apparently falling over the entire three-dimensional game space 40 can be realized while the number of the snow objects 54 is reduced. That is, in the game machine 10 according to the present embodiment, an effect of snow apparently falling over the entire three-dimensional game space 40 can be realized while the processing load for the effect is reduced and the amount of memory required for the effect is reduced.

In addition, in the game machine 10 of the present embodiment, a relative position from the reference point Ob of the snow generation target region 52 is managed as the position of each snow object 54. Because of this, when the snow generation target region 52 and the snow objects 54 are moved corresponding to the movement of the virtual camera 46, basically, updating of the position coordinate of the reference point Ob of the snow generation target region 52 suffices, and thus the process is simplified.

The present invention is not limited to the embodiment described above.

For example, as the position coordinate of each snow object 54, a position coordinate in XwYwZw coordinate system may be stored in the "position coordinate" field of the snow object table. In this case, in the process of S105, the position coordinate (xn', yn', zn') of each snow object 54 in the XwYwZw coordinate system may be updated to (xn'+(1−α) *Δxw, yn'+(1−α)*Δyw, zn'+(1−α)*Δzw).

Alternatively, for example, when the virtual camera 46 is moved, in addition to or in place of inhibiting the amount of movement of each snow object 54 compared to the amount of movement of the virtual camera 46, transparency of the snow object 54 may be increased.

In this case, the transparency of the snow object 54 may be increased based on the amount of movement of the virtual camera 46. For example, a configuration may be employed in which the transparency of the snow object 54 is increased only when the amount of movement of the virtual camera 46 is greater than or equal to a predetermined amount. Alternatively, a configuration may be employed in which the transparency of each snow object 54 is increased based on a distance from the virtual camera 46 to the snow object 54. For example, the transparency of a snow object 54 may be increased when a distance from the virtual camera 46 to the snow object 54 is less than a predetermined distance.

In this configuration also, it is also possible to prevent a scene of the snow object 54 moving by a large amount from being displayed on the game screen when the virtual camera 46 moves by a large amount, and thus it is possible to inhibit the unpleasant impression for the game player.

In the above description, the virtual camera 46 is configured to be translated in the Zw axial direction. Alternatively, the virtual camera 46 may be translated in the Xw axial direction or the Yw axial direction or a direction of the virtual camera 46 may be changed with a center at the viewpoint position 48. In this case, a collision between the bottom surface region 52b of the snow generation target region 52 and the field object 42 may be determined so that a situation in which the bottom surface region 52b is placed below the field object 42 can be inhibited. In the present embodiment, because the snow object 54 does not disappear until the snow object 54 reaches the bottom surface region 52b of the snow generation target region 52, if the bottom surface region 52b is below the field object 42, the snow object 54 passing through the field object 42 would be displayed on the game screen. With the above-described configuration, such a disadvantage can be prevented.

The present invention is not limited to an effect of the falling snow, and may be applied to effects such as, for example, falling rain, falling sleet, risen fog, or falling cherry blossom petals.

Figure 12:
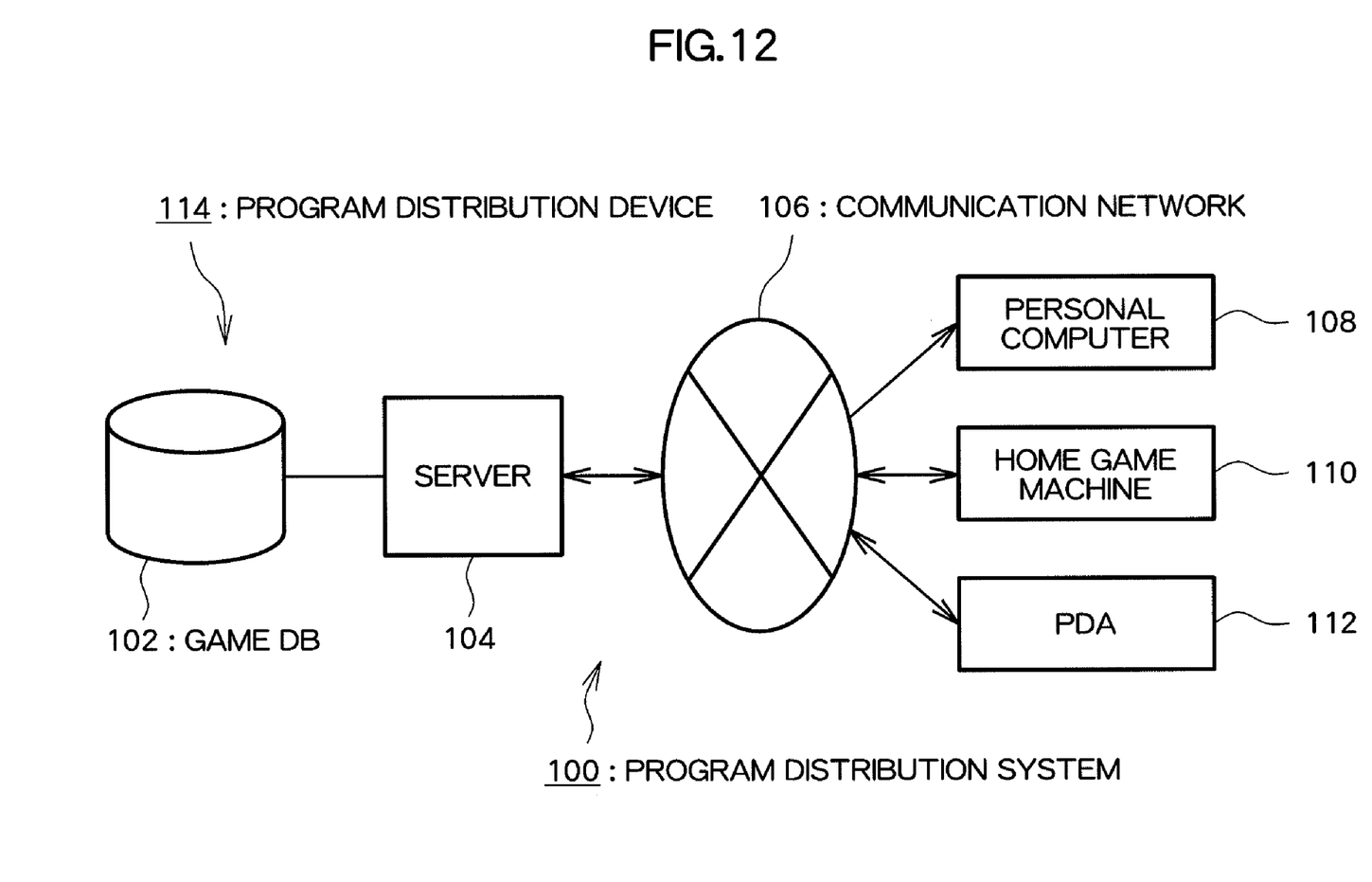
FIG. 12 is a diagram showing an overall structure of a program distribution system according to another preferred embodiment of the present invention.

In the above description, a program is supplied from the DVD-ROM 25 which is an information storage medium to the home game machine 11. Alternatively, the program may be distributed via a communication network to households. FIG. 12 is a diagram showing an overall structure of a program distribution system using a communication network. A program distribution method according to the present invention will now be described with reference to FIG. 12. As shown in FIG. 12, the program distribution system 100 comprises a game database 102, a server 104, a communication network 106, a personal computer 108, a home game machine 110, and a PDA (Personal Digital Assistant) 112. Of these, the game database 102 and the server 104 form a program distribution device 114. The communication network 106 includes, for example, the Internet or the cable television network. In this system, a program similar to the stored content of the DVD-ROM 25 is stored in the game database (information storage medium) 102. When a demander requests distribution of a game using the personal computer 108, the home game machine 110, or the PDA 112, the request is sent via the communication network 106 to the server 104. The server 104 reads the program from the game database 102 in response to the game distribution request, and sends the program to the origin of the game distribution request such as the personal computer 108, the home game machine 110, or the PDA 112. Here, a configuration is employed in which the game is distributed in response to the game distribution request, but alternatively, a configuration may be employed in which the game is distributed one-sidedly from the server 104. In addition, not all programs necessary for realizing the game need to be distributed at once (package distribution), and the necessary portion may be distributed according to the phase of the game (split distribution). By distributing the game via the communication network 106, it is possible for the demander to easily obtain the program.

The invention claimed is:

1. A game machine which displays a game screen representing a scene, in a three-dimensional game space, viewed from a given viewpoint position toward a given sight line direction, the game machine comprising:

environmental effect object placement means to place a plurality of environmental effect objects in a target region of the three-dimensional game space based on the viewpoint position and the sight line direction;

target region controlling means to move the target region, in response to a change of the viewpoint position or the sight line direction, based on the viewpoint position and the sight line direction after the change; and display means to display a game screen representing a scene, in the three-dimensional game space in which the plurality of environmental effect objects are placed in the target region, viewed from the viewpoint position toward the sight line direction.

2. The game machine according to claim 1, wherein the environmental effect object placement means moves, when the viewpoint position or the sight line direction changes, the plurality of environmental effect objects in the target region in a direction opposite to the direction of the change of viewpoint position or the sight line direction.

3. The game machine according to either claim 1 or 2, wherein
the target region controlling means comprises reference point position storage means to store a position of a reference point of the target region and, in response to the change of the viewpoint position or the sight line direction, updates the position of the reference point stored in the reference point position storage means based on the viewpoint position and the sight line direction after the change,
the environmental effect object placement means comprises environmental effect object position storage means to store a relative position from the reference position as a position of each of the plurality of environmental effect objects, and
the display means displays the game screen representing the scene, in the three-dimensional game space in which the plurality of environmental effect objects are placed in the target region, viewed from the viewpoint position toward the sight line direction based on a stored content of the reference point position storage means and a stored content of the environmental effect object position storage means.

4. The game machine according to either claim 1 or claim 2, wherein
the environmental effect object placement means changes a transparency of the environmental effect object when the viewpoint position or the sight line direction changes.

5. The game machine according to claim 1, wherein the environmental effect object placement means comprises:
means to move the plurality of environmental effect objects, when the viewpoint position is moved in the target region in a direction opposite to the movement direction of the viewpoint position; and
means to set an amount of movement obtained by multiplying the amount of movement of the viewpoint position by a predetermined coefficient $\alpha$ ($0<\alpha<1$) as the amount of movement of the plurality of environmental effect objects, when the plurality of environmental effect objects are moved in the target region in a direction opposite to the movement direction of the viewpoint position.

6. The game machine according to claim 1, wherein the environmental effect object placement means comprises:
means to determine whether or not the amount of the movement of the viewpoint position is greater than or equal to a predetermined amount when the viewpoint position is moved;
means to move the plurality of environmental effect objects, when the viewpoint position is moved in the target region in a direction opposite to the movement direction of the viewpoint position; and
means to increase a transparency of the plurality of environmental effect objects, when the movement amount of the viewpoint position is determined as greater than or equal to the predetermined amount and the plurality of environmental effect objects are moved in the target region in a direction opposite to the movement direction of the viewpoint position.

7. A method of controlling a game machine which displays a game screen representing a scene, in a three-dimensional game space, viewed from a given viewpoint position toward a given sight line direction, the method comprising:
an environmental effect object placement step realized by a microprocessor, in which a plurality of environmental effect objects are placed in a target region of the three-dimensional game space based on the viewpoint position and the sight line direction;
a target region controlling step, realized with said microprocessor, in which the target region is moved, in response to a change of the viewpoint position or the sight line direction, based on the viewpoint position and the sight line direction after the change; and
a display controlling step, realized with said microprocessor, in which a display device displays a game screen representing a scene, in the three-dimensional game space in which the plurality of the environmental effect objects are placed in the target region, viewed from the viewpoint position toward the sight line direction.

8. A non-transitory computer readable information storage medium storing a program which, when executed by a computer, causes the computer to function as a game machine which displays a game screen representing a scene, in a three-dimensional game space, viewed from a given viewpoint position toward a given sight line direction, the program causing the computer to function as:
environmental effect object placement means to place a plurality of environmental effect objects in a target region of the three-dimensional game space based on the viewpoint position and the sight line direction;
target region controlling means to, in response to a change of the viewpoint position or the sight line direction, move the target region based on the viewpoint position and the sight line direction after the change; and
display means to display a game screen representing a scene, in the three-dimensional game space in which the plurality of environmental effect objects are placed in the target region, viewed from the viewpoint position toward the sight line direction.

\* \* \* \* \*